United States Patent
Xia

(10) Patent No.: US 10,893,440 B2
(45) Date of Patent: Jan. 12, 2021

(54) NETWORK HOTSPOT CONTROL METHOD AND RELATED DEVICE

(71) Applicant: Huawei Technologies Co., Ltd., Shenzhen (CN)

(72) Inventor: Panbin Xia, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/095,855

(22) PCT Filed: Nov. 4, 2016

(86) PCT No.: PCT/CN2016/104708
§ 371 (c)(1),
(2) Date: Oct. 23, 2018

(87) PCT Pub. No.: WO2018/082044
PCT Pub. Date: May 11, 2018

(65) Prior Publication Data
US 2019/0320349 A1     Oct. 17, 2019

(51) Int. Cl.
*H04W 28/10* (2009.01)
*H04W 48/02* (2009.01)
(Continued)

(52) U.S. Cl.
CPC ........... *H04W 28/10* (2013.01); *H04W 48/02* (2013.01); *H04W 88/04* (2013.01); *H04W 88/06* (2013.01); *H04W 88/08* (2013.01); *H04W 84/12* (2013.01)

(58) Field of Classification Search
None
See application file for complete search history.

(56) References Cited

U.S. PATENT DOCUMENTS 7,706,291 B2 * 4/2010 Luft .................. H04N 21/2407
                                                          370/246
7,773,510 B2 * 8/2010 Back ........................ H04L 45/04
                                                          370/230
(Continued)

FOREIGN PATENT DOCUMENTS

CN     103561470 A    2/2014
CN     103945410 A    7/2014
(Continued)

OTHER PUBLICATIONS

Machine Translation and Abstract of Chinese Publication No. CN105321470, Feb. 10, 2016, 13 pages.
(Continued)

*Primary Examiner* — Andrew C Oh
(74) *Attorney, Agent, or Firm* — Conley Rose, P.C.

(57) ABSTRACT

A network hotspot control method and a mobile terminal to diversify shared-hotspot control manners, where the method includes receiving, by a first mobile terminal, a hotspot setting operation, setting a control policy of a network hotspot, where the control policy includes at least a file type control policy receiving, by the first mobile terminal, a network service request from a second mobile terminal that has established a coupling to the first mobile terminal, and controlling, by the first mobile terminal, the network service request according to the control policy.

20 Claims, 11 Drawing Sheets

(51) Int. Cl.
  *H04W 88/04* (2009.01)
  *H04W 88/06* (2009.01)
  *H04W 88/08* (2009.01)
  *H04W 84/12* (2009.01)

(56) References Cited

U.S. PATENT DOCUMENTS

| | | | | |
|---|---|---|---|---|
| 8,131,303 | B2* | 3/2012 | Cook | H04M 11/062 |
| | | | | 455/450 |
| 8,479,276 | B1* | 7/2013 | Vaystikh | G06F 21/577 |
| | | | | 726/13 |
| 10,015,285 | B2* | 7/2018 | Callard | H04N 21/222 |
| 10,324,980 | B2* | 6/2019 | Shachrai | G10L 25/63 |
| 2007/0058632 | A1* | 3/2007 | Back | H04L 43/00 |
| | | | | 370/392 |
| 2008/0089237 | A1* | 4/2008 | Molen | H04L 47/10 |
| | | | | 370/252 |
| 2010/0099388 | A1* | 4/2010 | Aaron | H04L 67/306 |
| | | | | 455/414.1 |
| 2010/0157802 | A1* | 6/2010 | Casey | H04L 63/0263 |
| | | | | 370/235 |
| 2010/0162359 | A1* | 6/2010 | Casey | H04L 67/22 |
| | | | | 726/3 |
| 2010/0172257 | A1* | 7/2010 | Yu | H04L 63/0245 |
| | | | | 370/252 |
| 2012/0082148 | A1* | 4/2012 | Sperling | G06Q 30/04 |
| | | | | 370/338 |
| 2012/0165036 | A1* | 6/2012 | Shook | H04W 64/00 |
| | | | | 455/456.1 |
| 2012/0275300 | A1* | 11/2012 | Munoz de la Torre Alonso | |
| | | | | H04L 67/16 |
| | | | | 370/229 |
| 2012/0300638 | A1* | 11/2012 | Zhou | H04W 8/082 |
| | | | | 370/236 |
| 2013/0107715 | A1* | 5/2013 | Szabo | H04L 43/16 |
| | | | | 370/235 |
| 2013/0117442 | A1* | 5/2013 | Mountain | H04N 21/44231 |
| | | | | 709/224 |
| 2013/0117809 | A1* | 5/2013 | McDougal | H04L 63/1408 |
| | | | | 726/1 |
| 2013/0132854 | A1* | 5/2013 | Raleigh | H04W 4/60 |
| | | | | 715/738 |
| 2013/0148605 | A1* | 6/2013 | Jin | H04W 72/1242 |
| | | | | 370/329 |
| 2013/0322366 | A1* | 12/2013 | Racz | H04L 47/2483 |
| | | | | 370/329 |
| 2014/0033288 | A1 | 1/2014 | Wynn et al. | |
| 2014/0047188 | A1* | 2/2014 | Xia | H04L 67/2852 |
| | | | | 711/133 |
| 2014/0052836 | A1* | 2/2014 | Nguyen | H04L 45/38 |
| | | | | 709/223 |
| 2014/0071833 | A1* | 3/2014 | Agrawal | H04L 1/1877 |
| | | | | 370/242 |
| 2014/0133456 | A1* | 5/2014 | Donepudi | H04W 64/003 |
| | | | | 370/331 |
| 2014/0199962 | A1* | 7/2014 | Mohammed | H04W 4/24 |
| | | | | 455/406 |
| 2014/0269774 | A1* | 9/2014 | Callard | H04N 21/222 |
| | | | | 370/477 |
| 2014/0286343 | A1* | 9/2014 | Sung | H04L 41/0668 |
| | | | | 370/400 |
| 2014/0334502 | A1* | 11/2014 | Gammon | H04L 69/08 |
| | | | | 370/466 |
| 2014/0341109 | A1* | 11/2014 | Cartmell | H04L 43/50 |
| | | | | 370/328 |
| 2015/0009990 | A1* | 1/2015 | Sung | H04L 45/026 |
| | | | | 370/392 |
| 2015/0009991 | A1* | 1/2015 | Sung | H04W 76/12 |
| | | | | 370/392 |
| 2015/0026756 | A1* | 1/2015 | Reddy | H04W 12/08 |
| | | | | 726/1 |
| 2015/0026757 | A1* | 1/2015 | Reddy | H04L 63/10 |
| | | | | 726/1 |
| 2015/0081903 | A1* | 3/2015 | Molinero Fernandez | |
| | | | | H04M 15/66 |
| | | | | 709/225 |
| 2015/0117467 | A1* | 4/2015 | Leung | H04W 4/029 |
| | | | | 370/465 |
| 2015/0124616 | A1* | 5/2015 | Lohman | H04L 43/0894 |
| | | | | 370/235 |
| 2015/0149657 | A1* | 5/2015 | Reddy | H04L 45/72 |
| | | | | 709/242 |
| 2015/0163330 | A1* | 6/2015 | Ni | H04L 63/20 |
| | | | | 370/392 |
| 2015/0193567 | A1* | 7/2015 | Warshavsky | H04L 67/38 |
| | | | | 703/13 |
| 2015/0215186 | A1* | 7/2015 | Alonso Franco | H04W 12/08 |
| | | | | 709/224 |
| 2015/0281408 | A1* | 10/2015 | Kwan | H04L 63/0272 |
| | | | | 370/474 |
| 2015/0289121 | A1* | 10/2015 | Lesage | H04W 4/90 |
| | | | | 455/404.1 |
| 2015/0358905 | A1* | 12/2015 | Ding | H04W 52/0209 |
| | | | | 370/311 |
| 2016/0094521 | A1* | 3/2016 | Rao | H04L 63/0428 |
| | | | | 713/171 |
| 2016/0119198 | A1* | 4/2016 | Kfir | H04L 69/22 |
| | | | | 709/224 |
| 2016/0198394 | A1* | 7/2016 | Heikkila | H04L 43/028 |
| | | | | 370/328 |
| 2016/0218951 | A1* | 7/2016 | Vasseur | H04L 43/022 |
| 2016/0286463 | A1* | 9/2016 | Cheng | H04W 48/02 |
| 2016/0294682 | A1* | 10/2016 | Bi | H04L 45/38 |
| 2016/0294714 | A1* | 10/2016 | Persson | H04L 47/25 |
| 2016/0295456 | A1* | 10/2016 | Zhang | H04J 11/0023 |
| 2016/0301707 | A1* | 10/2016 | Cheng | H04L 43/12 |
| 2016/0315920 | A1* | 10/2016 | Kurmala | H04L 63/0471 |
| 2016/0380975 | A1* | 12/2016 | Reddy | H04L 61/1511 |
| | | | | 726/12 |
| 2017/0019316 | A1* | 1/2017 | Finkelman | H04L 43/028 |
| 2017/0031930 | A1* | 2/2017 | Shachrai | H04L 67/146 |
| 2017/0054688 | A1* | 2/2017 | Bhattacharjee | H04L 41/5003 |
| 2017/0085440 | A1* | 3/2017 | Dosovitsky | H04L 63/0245 |
| 2017/0195254 | A1* | 7/2017 | Pham | H04L 41/0896 |
| 2017/0289046 | A1* | 10/2017 | Faccin | H04L 47/2433 |
| 2017/0339729 | A1* | 11/2017 | Szabo | H04W 28/0268 |
| 2017/0353501 | A1* | 12/2017 | Lau | H04L 63/20 |
| 2018/0007106 | A1* | 1/2018 | Racz | H04L 65/60 |
| 2018/0034779 | A1* | 2/2018 | Ahuja | G06F 16/90344 |
| 2018/0048578 | A1* | 2/2018 | Rollet | H04L 69/22 |
| 2018/0048691 | A1* | 2/2018 | Pruden | H04L 65/601 |
| 2018/0062986 | A1* | 3/2018 | Murgia | H04L 45/64 |
| 2018/0095512 | A1* | 4/2018 | Artstain | H04W 52/0209 |
| 2018/0103382 | A1* | 4/2018 | Hassan | H04L 45/00 |
| 2018/0110073 | A1* | 4/2018 | Mestanov | H04W 74/0816 |
| 2018/0219796 | A1* | 8/2018 | Fadle | H04L 43/0888 |

FOREIGN PATENT DOCUMENTS

| | | |
|---|---|---|
| CN | 104486505 A | 4/2015 |
| CN | 104619045 A | 5/2015 |
| CN | 105321470 A | 2/2016 |
| CN | 105430713 A | 3/2016 |
| CN | 105704757 A | 6/2016 |
| EP | 2045968 A1 | 4/2009 |

OTHER PUBLICATIONS

Foreign Communication From a Counterpart Application, Chinese Application No. 201680058777.0, Chinese Office Action dated Sep. 24, 2019, 7 pages.
Foreign Communication From a Counterpart Application, European Application No. 16920607.5, Extended European Search Report dated Feb. 12, 2019, 7 pages.
Machine Translation and Abstract of Chinese Publication No. CN103561470, Feb. 5, 2014, 8 pages.

(56) References Cited

OTHER PUBLICATIONS

Machine Translation and Abstract of Chinese Publication No. CN103945410, Jul. 23, 2014, 10 pages.
Machine Translation and Abstract of Chinese Publication No. CN104486505, Apr. 1, 2015, 12 pages.
Machine Translation and Abstract of Chinese Publication No. CN104619045, May 13, 2015, 36 pages.
Machine Translation and Abstract of Chinese Publication No. CN105430713, Mar. 23, 2016, 20 pages.
Machine Translation and Abstract of Chinese Publication No. CN105704757, Jun. 22, 2016, 13 pages.
Foreign Communication From a Counterpart Application, PCT Application No. PCT/CN2016/104708, English Translation of International Search Report dated Jul. 26, 2017, 2 pages.

* cited by examiner

File type
☑ Text   ☑ Image   ☐ Audio   ☐ Video

Allowed duration (min)

[ 30 min ▾ ]

Allowed traffic (M)

[ No limit ▾ ]

NETWORK HOTSPOT CONTROL METHOD AND RELATED DEVICE

CROSS-REFERENCE TO RELATED APPLICATIONS

This application is a U.S. National Stage of International Patent Application No. PCT/CN2016/104708 filed on Nov. 4, 2016, which is hereby incorporated by reference in its entirety.

TECHNICAL FIELD

The present invention relates to the Internet communications field, and in particular, to a network hotspot control method and a related device.

BACKGROUND

With fast development of the Internet, people increasingly rely on the Internet in daily life and need to obtain wanted information at any time and any place by using the Internet. When a mobile terminal of a user cannot access the Internet, the mobile terminal may access the Internet by using a network shared by another mobile terminal.

A mobile terminal may provide a shared hotspot by using a portable Wireless Fidelity (Wi-Fi, wireless fidelity) module, and the mobile terminal serves as an Internet access point to provide a mobile data service for another mobile terminal. However, in an actual use process, there is no effective traffic control means, and even though a large amount of traffic is consumed by the shared hotspot, expected effects are usually not achieved. Therefore, a severe waste of traffic is caused.

At present, some mobile terminals such as Android mobile terminals may limit total traffic used for mobile network sharing, and a limit principle thereof is to obtain received or sent traffic of a specified application by using a trafficstats (trafficstats) class, that is, obtain a quantity of bytes that are received by the specified program through a network and obtain a quantity of bytes that are sent by the specified program through a network, so as to determine total traffic consumed by the specified program.

At present, some mobile terminals are provided with a traffic tracking function of limiting traffic used for a single time. For example, it is limited that only traffic of 100 M is shared with another mobile terminal this time, and after the another mobile terminal uses up the traffic of 100 M, the mobile terminal does not provide traffic for the another mobile terminal any more. Although this limiting manner can implement hotspot sharing for another mobile terminal, this manner is monotonous in control.

SUMMARY

Embodiments of the present invention provide a network hotspot control method and a related device, to diversify network hotspot control manners.

A first aspect of the embodiments of the present invention provides a network hotspot control method, including: enabling, by a first mobile terminal, a network hotspot function in response to a hotspot setting operation of a user, and setting a corresponding control policy on a setting interface depending on a need, where the control policy includes at least control over a file type; establishing, by a second mobile terminal, a connection to the first mobile terminal by using a network hotspot, and sending a network service request to the first mobile terminal; and limiting, by the first mobile terminal, the network service request according to the specified control policy. According to the embodiments of the present invention, the network hotspot is controlled according to different specified control policies, thereby diversifying network hotspot control manners.

With reference to the first aspect of the embodiments of the present invention, in a first implementation of the first aspect of the embodiments of the present invention, the file type control policy includes a target file type for which traffic shared by the first mobile terminal is used, and the method specifically includes: enabling, by the first mobile terminal, the network sharing hotspot function in response to the setting operation of the user, and setting a corresponding option on the setting interface depending on a need; sending, by the second mobile terminal, a connection request to the first mobile terminal by using the network hotspot; authenticating, by the first mobile terminal, the second mobile terminal; establishing, by the second mobile terminal, the connection to the first mobile terminal after authentication succeeds; sending, by the second mobile terminal, the network service request to the first mobile terminal; and providing, by the first mobile terminal, needed traffic for the network service request of the second mobile terminal according to the control policy set for the target filter type. According to the embodiments of the present invention, precise control over the network hotspot is implemented according to different specified file type control policies.

With reference to the first implementation of the first aspect of the embodiments of the present invention, in a second implementation of the first aspect of the embodiments of the present invention, the target file type includes at least one of text, image, audio, and video, and the controlling, by the first mobile terminal based on the target file type, traffic used for the network service request includes: receiving, by the first mobile terminal, the network service request sent by the second mobile terminal; performing packet inspection on the network service request to obtain a file type of content requested by the network service request; and rejecting, by the first mobile terminal, the service request of the second mobile terminal when determining that the file type of the requested content is out of the scope of the target file type; when determining that the file type of the requested content overlaps with the target file type, filtering out, by the first mobile terminal, a file type that is in the network service request and that does not overlap with the target file type; and sending, by the first mobile terminal, a filtered network service request to a destination server, and sending the requested content to the second mobile terminal. For example, when the content requested by the network service request is of a text type and an image type, and the specified target file type is text, the text type is an overlapped file type, and the image type is a non-overlapped file type. The first mobile terminal filters out the image type in the requested content, and sends the network service request that includes the text type to the Internet. According to the embodiments of the present invention, an implementation process of controlling traffic by the first mobile terminal based on different file types is detailed, and the embodiments of the present invention are easier to operate and implement.

With reference to the second implementation of the first aspect of the embodiments of the present invention, in a third implementation of the first aspect of the embodiments of the present invention, the performing, by the first mobile terminal, packet inspection on the network service request to obtain a file type of content requested by the network service request includes: performing, by the first mobile terminal, common packet inspection on the network service request to determine a protocol type of the requested content; determining, by the first mobile terminal based on indication of the protocol type, the file type of the requested content when the protocol type indicates a particular file type; or performing, by the first mobile terminal, deep packet parsing on the network service request when the protocol type indicates no particular file type, to obtain the file type of the requested content. File type based traffic control can be implemented based on different packet inspection manners.

With reference to any one of the first implementation of the first aspect to the third implementation of the first aspect of the embodiments of the present invention, in a fourth implementation of the first aspect of the embodiments of the present invention, when the control policy further includes total use traffic, and when the first mobile terminal controls, according to the control policy, the traffic used for the network service request, the method further includes: after receiving the network service request sent by the second mobile terminal, providing, by the first mobile terminal, a corresponding network service for the second mobile terminal; recording, by the first mobile terminal, a quantity of received bytes and a quantity of sent bytes when the second mobile terminal accesses a network, where a sum of the quantity of received bytes and the quantity of sent bytes is target total traffic; determining, by the first mobile terminal, whether the target total traffic reaches total traffic set in a preset total traffic control policy; and when the target total traffic reaches the total use traffic, stopping, by the first mobile terminal, providing traffic for the network service of the second mobile terminal. According to the embodiments of the present invention, the control policy that also includes total use traffic is further provided, and a network service may be provided for the second mobile terminal based on different specified total use traffic, thereby diversifying traffic control manners of the network sharing hotspot and implementing precise and accurate traffic control.

With reference to any one of the first implementation of the first aspect to the third implementation of the first aspect of the embodiments of the present invention, in a fifth implementation of the first aspect of the embodiments of the present invention, when the control policy further includes total use duration, and when the first mobile terminal controls, according to the control policy, the traffic used for the network service request, the method further includes: after receiving the network service request sent by the second mobile terminal, providing, by the first mobile terminal, a corresponding network service for the second mobile terminal; recording, by the first mobile terminal as a first moment, a moment at which the service starts to be provided for the second mobile terminal; recording, by the first mobile terminal in real time, a current moment as a second moment; comparing, by the first mobile terminal, the first moment and the second moment to obtain a time difference, and determining whether the time difference reaches the preset total use duration; and if the time difference reaches the preset total use duration, stopping, by the first mobile terminal, providing traffic for the network service of the second mobile terminal. According to the embodiments of the present invention, the control policy that also includes total use duration is further provided, and a network service may be provided for the second mobile terminal based on different specified total traffic use duration, thereby diversifying traffic control manners of the network sharing hotspot.

A second aspect of the embodiments of the present invention provides a mobile terminal including: an input unit, configured to receive a hotspot setting operation; a setting unit, configured to set a control policy of a network hotspot based on the hotspot setting operation received by the input unit, where the control policy includes a file type control policy; a receiving unit, configured to receive a network service request sent by a second mobile terminal that has established a connection to the mobile terminal; and a control unit, configured to control, according to the control policy set by the setting unit, the network service request received by the receiving unit. According to the embodiments of the present invention, the network hotspot is controlled according to different specified control policies, thereby diversifying network hotspot control manners.

With reference to the second aspect of the embodiments of the present invention, in a first implementation of the second aspect of the embodiments of the present invention, the file type control policy includes a target file type for which traffic shared by the first mobile terminal is used; and the control unit is specifically configured to control, based on the target file type, traffic used for the network service request. According to the embodiments of the present invention, precise control over the network hotspot is implemented according to different specified file type control policies.

With reference to the first implementation of the second aspect of the embodiments of the present invention, in a second implementation of the second aspect of the embodiments of the present invention, the mobile terminal further includes a sending unit, and the control unit includes a detection sub-unit, a determining sub-unit, and a filtering sub-unit, where the detection sub-unit is configured to: when the target file type includes at least one of text, image, audio, and video, perform packet inspection on the network service request to obtain a file type of content requested by the network service request; the determining sub-unit is configured to: when determining that the file type, of the requested content, detected by the detection sub-unit is out of the scope of the target file type, send a rejection response to the second mobile terminal via the sending unit; the filtering sub-unit is configured to: when the determining sub-unit determines that the file type of the requested content overlaps with the target file type, filter out a file type that is in the network service request and that does not overlap with the target file type; and the sending unit is further configured to: send a filtered network service request to a destination server, and send, to the second mobile terminal, content that is allowed to use the traffic and that is returned by the destination server. According to the embodiments of the present invention, an implementation process of controlling traffic by the first mobile terminal based on different file types is detailed, and the embodiments of the present invention are easier to operate and implement.

With reference to the second implementation of the second aspect of the embodiments of the present invention, in a third implementation of the second aspect of the embodiments of the present invention, the detection sub-unit is specifically configured to: perform common packet inspection on the network service request to determine a protocol type of the requested file content; and determine, based on indication of the protocol type, the file type of the requested content when the protocol type indicates a particular file type; or perform deep packet parsing on the network service request when the protocol type indicates no particular file type, to obtain the file type of the requested content. File type based traffic control can be implemented based on different packet inspection manners.

With reference to any one of the first implementation of the second aspect to the third implementation of the second aspect of the embodiments of the present invention, in a fourth implementation of the second aspect of the embodiments of the present invention, the control unit further includes a first obtaining sub-unit, a second obtaining sub-unit, a first judgment sub-unit, and a control sub-unit; the first obtaining sub-unit is configured to obtain a quantity of bytes received by the second mobile terminal; the second obtaining sub-unit is configured to obtain a quantity of bytes sent by the second mobile terminal; the first judgment sub-unit is configured to determine whether target total traffic of the second mobile terminal reaches the total use traffic, where the target total traffic is a sum of the quantity of bytes received by the second mobile terminal that is obtained by the first obtaining sub-unit and the quantity of bytes sent by the second mobile terminal that is obtained by the second obtaining sub-unit; and the control sub-unit is further configured to: if the first judgment sub-unit determines that the target total traffic reaches the total use traffic, control the mobile terminal to stop providing a network service for the second mobile terminal. According to the embodiments of the present invention, the control policy that also includes total use traffic is further provided, and a network service may be provided for the second mobile terminal based on different specified total use traffic, thereby diversifying traffic control manners of the network sharing hotspot and implementing precise and accurate traffic control.

With reference to any one of the first implementation of the second aspect to the third implementation of the second aspect of the embodiments of the present invention, in a fifth implementation of the second aspect of the embodiments of the present invention, the control unit further includes a first record sub-unit, a second record sub-unit, a second judgment sub-unit, and a control sub-unit; the first record sub-unit is configured to record a first moment at which the second mobile terminal starts to use the traffic; the second record sub-unit is configured to record a second moment at which the second mobile terminal is currently using the traffic; the second judgment sub-unit is configured to determine whether a time difference between the second moment recorded by the second record sub-unit and the first moment recorded by the first record sub-unit reaches the total use duration; and the control sub-unit is further configured to: if the second judgment sub-unit determines that the time difference reaches the total use duration, control the mobile terminal to stop providing a network service for the second mobile terminal. According to the embodiments of the present invention, the control policy that also includes total use duration is further provided, and a network service may be provided for the second mobile terminal based on different specified total traffic use duration, thereby diversifying traffic control manners of the network sharing hotspot.

A third aspect of the embodiments of the present invention provides a mobile terminal, and the mobile terminal includes a Wi-Fi module, an input unit, a display unit, a memory, and a processor that are connected by using a bus, where the input unit is configured to receive a hotspot setting operation; the display unit is configured to display a setting interface used to set a control policy of a network hotspot; the processor is configured to set the control policy of the network hotspot based on the hotspot setting operation, where the control policy includes a file type control policy; the memory is configured to store the control policy; the Wi-Fi module is configured to receive a network service request sent by a second mobile terminal that has established a connection to the mobile terminal; and the processor is configured to control the network service request according to the control policy. According to the embodiments of the present invention, the processor sets different control policies and the Wi-Fi module controls the network hotspot, thereby diversifying network hotspot control manners.

With reference to the third aspect of the embodiments of the present invention, in a first implementation of the third aspect of the embodiments of the present invention, the file type control policy includes a target file type for which traffic shared by the first mobile terminal is used; and the processor is specifically configured to control, based on the target file type, traffic used for the network service request. According to the embodiments of the present invention, precise control over the network hotspot is implemented according to different file type control policies set by the processor.

With reference to the first implementation of the third aspect of the embodiments of the present invention, in a second implementation of the third aspect of the embodiments of the present invention, the mobile terminal further includes an RF circuit, and the RF circuit is connected to the processor by using the bus; the processor is specifically configured to perform packet inspection on the network service request to obtain a file type of content requested by the network service request; the Wi-Fi module is configured to: when the processor determines that the file type of the requested content is out of the scope of the target file type, send a rejection response to the second mobile terminal; the processor is further configured to: when determining that the file type of the requested content overlaps with the target file type, filter out a file type that is in the network service request and that does not overlap with the target file type; the RF circuit is configured to: after the processor filters the network service request, send a filtered network service request to a destination server, and receive content that is allowed to use the traffic and that is returned by the destination server; and the Wi-Fi module is further configured to send the content that is allowed to use the traffic to the second mobile terminal. According to the embodiments of the present invention, an implementation process of controlling traffic by the first mobile terminal based on different file types is detailed, and the embodiments of the present invention are easier to operate and implement.

With reference to the second implementation of the third aspect of the embodiments of the present invention, in a third implementation of the third aspect of the embodiments of the present invention, the processor is specifically configured to: perform common packet inspection on the network service request to determine a protocol type of the requested file content; and determine, based on indication of the protocol type, the file type of the requested content when the protocol type indicates a particular file type; or perform deep packet parsing on the network service request when the protocol type indicates no particular file type, to obtain the file type of the requested content. File type based traffic control can be implemented based on different packet inspection manners.

With reference to any one of the first implementation of the third aspect to the third implementation of the third aspect of the embodiments of the present invention, in a fourth implementation of the third aspect of the embodiments of the present invention, the mobile terminal further includes a counter, and the counter is connected to the processor by using the bus; the counter is specifically configured to collect a quantity of bytes received by the second mobile terminal and a quantity of bytes sent by the second mobile terminal; and the processor is further configured to: obtain, from the counter, the quantity of bytes received by the second mobile terminal and the quantity of bytes sent by the second mobile terminal, determine whether target total traffic of the second mobile terminal reaches the total use traffic, where the target total traffic is a sum of the quantity of bytes received by the second mobile terminal and the quantity of bytes sent by the second mobile terminal, and if the target total traffic of the second mobile terminal reaches the total use traffic, control the Wi-Fi module to stop providing a network service for the second mobile terminal. According to the embodiments of the present invention, the control policy that also includes total use traffic is further provided, and the Wi-Fi module may provide the network service for the second mobile terminal based on different total use traffic set by the processor, thereby diversifying traffic control manners of the network sharing hotspot and implementing precise and accurate traffic control.

With reference to any one of the first implementation of the third aspect to the third implementation of the third aspect of the embodiments of the present invention, in a fifth implementation of the third aspect of the embodiments of the present invention, the mobile terminal further includes a timer, and the timer is connected to the processor by using the bus; the timer is specifically configured to record a first moment at which the second mobile terminal starts to use the traffic and a second moment at which the second mobile terminal is currently using the traffic; and the processor is further configured to: obtain the first moment and the second moment from the timer; determine whether a time difference between the second moment and the first moment reaches the total use duration; and if the time difference between the second moment and the first moment reaches the total use duration, control the Wi-Fi module to stop providing a network service for the second mobile terminal. According to the embodiments of the present invention, the control policy that also includes total use duration is further provided, and the Wi-Fi module may provide the network service for the second mobile terminal based on different total traffic use duration set by the processor, thereby diversifying traffic control manners of the network sharing hotspot.

From the foregoing technical solutions, it can be learned that the embodiments of the present invention have the following advantages:

In the technical solutions provided in the embodiments of the present invention, the first mobile terminal sets the control policy of the network hotspot in response to the setting operation of the user, where the control policy includes the file type control policy; the first mobile terminal receives the network service request sent by the second mobile terminal that has established a connection to the first mobile terminal; and the first mobile terminal controls the network service request according to the control policy. According to the embodiments of the present invention, precise control can be performed on the network sharing hotspot according to different control policies, thereby diversifying network sharing hotspot control manners.

BRIEF DESCRIPTION OF DRAWINGS

FIG. 2 is a schematic diagram of an example of a setting interface according to an embodiment of the present invention;

FIG. 8 is a schematic diagram of a scenario of file type, duration, and total traffic settings for traffic control according to an embodiment of the present invention;

FIG. 9 is a schematic diagram of another scenario of file type, duration, and total traffic settings for traffic control according to an embodiment of the present invention;

DESCRIPTION OF EMBODIMENTS

The embodiments of the present invention provide a network hotspot control method and a related device, to diversify network hotspot control manners.

To make persons skilled in the art understand the technical solutions in the present invention better, the following clearly and completely describes the technical solutions in the embodiments of the present invention with reference to the accompanying drawings in the embodiments of the present invention. Apparently, the described embodiments are some not all of the embodiments of the present invention.

In the specification, claims, and accompanying drawings of the present invention, the terms "first", "second", "third", "fourth", and so on (if existent) are intended to distinguish between similar objects but do not necessarily indicate a specific order or sequence. It should be understood that, the data termed in such a way are interchangeable in proper circumstances, so that the embodiments described herein can be implemented in orders other than the order illustrated or described herein. Moreover, the terms "include", "contain", and any variants thereof are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device.

Currently, only simple traffic control can be implemented based on total sharing traffic. For example, it is set that only traffic of 100 M is shared this time. This cannot meet a typical application scenario of some users. For example, a user needs to browse news through a notebook computer in a high-speed railway compartment, and the user turns a 4G mobile phone into a mobile network sharing hotspot. Because control is performed on only total traffic, a large amount of traffic is shortly consumed by an image and a video on a page instead of wanted text information. Therefore, in an existing network hotspot control solution, traffic control cannot be performed based on different user requirements, and total traffic shared by a sharing hotspot is controlled in a monotonous manner. Therefore the control manner is monotonous.

Figure 1:
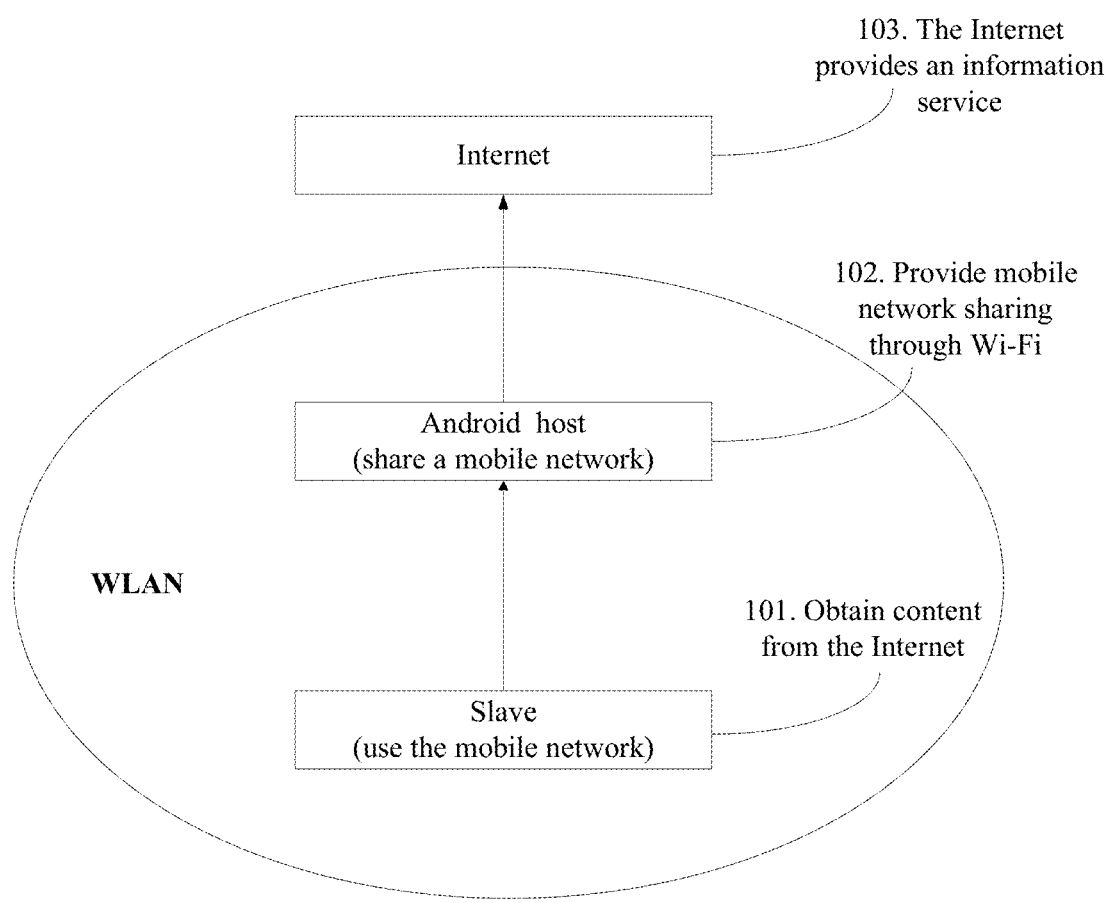
FIG. 1 is a schematic diagram of a network architecture for network hotspot sharing.

FIG. 1 is a schematic diagram of a network architecture for network hotspot sharing.

As shown in FIG. 1, in the network architecture, a slave (Slave) is connected to a host by using a Wi-Fi hotspot, and exchanges information with the Internet by using traffic of the host. This process is specifically as follows:

101. The slave requests to obtain content from the Internet by using the hotspot shared by the host.

102. The host provides mobile network sharing through Wi-Fi.

103. The Internet provides an information service for the slave.

The host is a mobile terminal, and can support a hotspot sharing function and is capable of accessing the Internet. The host may be a mobile terminal supporting an operating system such as the Android or the OS. The slave can support a hotspot sharing function and is capable of accessing the Internet. The slave may be an Android mobile phone, an iOS mobile phone, a notebook computer, or another device that is capable of accessing the Internet. The slave exchanges information with the Internet via the host. The present invention also applies the foregoing network architecture.

In this embodiment of the present invention, the host in FIG. 1 may be a first mobile terminal, and the slave in FIG. 1 may be a second mobile terminal. According to the network hotspot control solution in this embodiment of the present invention, a control policy needs to be set first, and then control is performed according to the specified control policy. A process of setting the control policy and performing network hotspot control may be generally as follows:

The first mobile terminal enables a network sharing hotspot function, for example, a hotspot name is set as "WLAN001". The first mobile terminal provides a setting interface for a user to set the control policy. The setting interface may be pre-configured in the first mobile terminal. When the network sharing hotspot function is enabled, the first mobile terminal invokes the pre-configured setting interface and displays the setting interface on a display screen. For example, as shown in FIG. 2, the setting interface may display a file type option. For example, the option may include at least one of text, audio, image, and video. The user may choose, by ticking an option, a file type that may use traffic. The setting interface may further include boxes for specifying total traffic use duration and/or total use traffic. The user may enter a specific value of the total traffic use duration and/or the total use traffic into a corresponding box. After the user sets the control policy on the setting interface, a hotspot service may be provided for the second mobile terminal according to the control policy. As shown in FIG. 2, a text option and an image option are ticked, and 30 minutes is entered into the box for specifying total traffic use duration. Certainly, FIG. 2 shows only an example for description. There may be many control policies, and examples are not described one by one.

The second mobile terminal finds the hotspot "WLAN001" enabled by the first mobile terminal, and establishes a connection to the first mobile terminal that has enabled the network hotspot function. The second mobile terminal sends a network service request to the first mobile terminal. After receiving the network service request, the first mobile terminal controls the network service request according to the specified control policy. In this embodiment of the present invention, the user may set at least a file type control policy by using the first mobile terminal, so as to perform precise control on the network sharing hotspot, thereby diversifying network hotspot control manners. In the following embodiments, the first mobile terminal is referred to as a first terminal, the second mobile terminal is referred to as a second terminal, and the network sharing hotspot is referred to as a network hotspot. An example is used for description in the following.

The foregoing embodiment briefly describes a manner for setting a control policy on a setting interface. Actually, a plurality of control policies may be set in the embodiments of the present invention, for example, may include the following.

Control policy A: The control policy includes a file type control policy.

The control policy A may further include some specific control policies a. For example, when a file type includes four types: text, audio, image, and video, control policies a that may be combined based on the four types may include:
control policy a1: text;
control policy a2: audio;
control policy a3: image;
control policy a4: video;
control policy a5: text+audio;
control policy a6: text+image;
control policy a7: text+video;
control policy a8: audio+image;
control policy a9: audio+video;
control policy a10: image+video;
control policy a11: text+audio+image;
control policy a12: text+audio+video;
control policy a13: text+image+video;
control policy a14: audio+image+video; and
control policy a15: text+audio+image+video.

With respect to setting the 15 file type control policies, a user just needs to tick a corresponding checkbox behind text, audio, image, and/or video on the setting interface to complete settings of any one of the 15 file type control policies. A selected type is a type for which the traffic is allowed to be used.

Control policy B: The control policy includes a file type control policy and a duration control policy.

In the duration control policy, a specific value of the total traffic use duration is entered into the box corresponding to the total traffic use duration. The specific value may be entered by the user depending on a need. Certainly, options such as 10 minutes, 30 minutes, and 60 minutes may also be provided in the dropdown list of the box. How a specific numeric value of the total traffic use duration is set is not limited in this embodiment of the present invention.

If the duration control policy is denoted as a control policy b, the control policy B is the control policy a+the control policy b, and may be a combination of any one of the control policies a1 to a15 and the control policy b.

Control policy C: The control policy includes a file type control policy and a total traffic control policy.

In the total traffic control policy, a specific value of the total use traffic is entered into the box corresponding to the total use traffic. The specific value may be entered by the user depending on a need. Certainly, options such as 100 M, 200 M, and 500 M may also be provided in the dropdown list of the box. How a specific value of the total use traffic is set is not limited in this embodiment of the present invention.

If the total traffic control policy is denoted as a control policy c, the control policy C is the control policy a+the control policy c, and may be a combination of any one of the control policies a1 to a15 and the control policy c.

Control policy D: The control policy includes a file type control policy, a duration control policy, and a total traffic control policy.

According to the description of the control policy A, the control policy B, and the control policy C, the control policy D may be a combination of any one of the control policies a1 to a15, the control policy b, and the control policy c.

After the control policy is set, in a process of providing a hotspot service for the second terminal, the first terminal performs traffic control according to the corresponding specified control policy.

A process of performing traffic control according to a control policy is described in the following embodiment.

Figure 3:
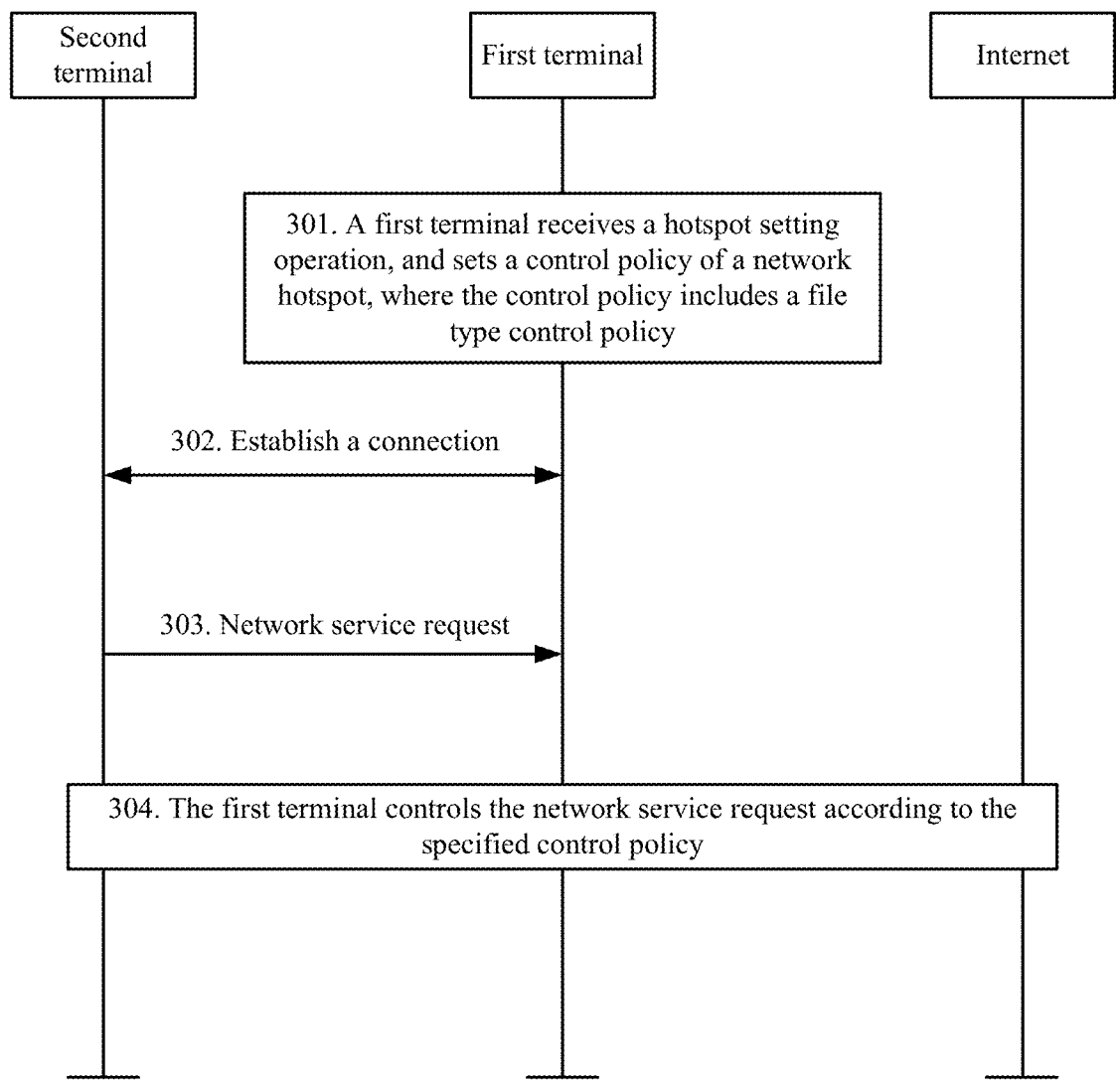
FIG. 3 is a schematic diagram of an embodiment of a network hotspot control method according to an embodiment of the present invention.

When the specified control policy is the control policy A, referring to FIG. 3, an embodiment of a network hotspot control method according to an embodiment of the present invention includes the following steps.

301. A first terminal receives a hotspot setting operation, and sets a control policy of a network hotspot, where the control policy includes a file type control policy.

A control policy setting process in this embodiment of the present invention has been described in the foregoing embodiment. Details are not repeated herein.

In this embodiment of the present invention, for example, the control policy set by the user is the control policy A, namely, the file type control policy.

302. The second terminal and the first terminal establish a hotspot connection.

The second terminal sends a connection establishment request to the first terminal, and the first terminal authenticates the second terminal according to the connection establishment request, and feeds back a connection establishment response to the second terminal based on an authentication result. After the second terminal has been authenticated by the first terminal, the second terminal establishes the hotspot connection to the first terminal via the network sharing hotspot of the first terminal. After the hotspot connection is established, the second terminal may send or receive data via the hotspot.

303. The first terminal receives a network service request sent by the second terminal.

After the second terminal establishes the hotspot connection to the first terminal, when the second terminal needs to access the Internet, the second terminal sends the network service request to the first terminal, and the first terminal receives the network service request.

304. The first terminal controls the network service request according to the specified control policy.

In this embodiment of the present invention, the first terminal controls the network service request according to the control policy A. To be specific, the first terminal performs packet inspection on the network service request to determine, from the network service request, a file type of content requested by the second terminal. A file type in the control policy A is a ticked file type for which the traffic is allowed to be used. In this embodiment of the present invention, the file type in the control policy A is referred to as a target file type.

The file type of the content requested by the second terminal is compared with the target file type. If the file type of the requested content is out of the scope of the target file type, the first terminal sends a rejection response to the second terminal. If the file type of the requested content overlaps with the target file type, the first terminal filters out a file type that is in the network service request and that does not overlap with the target file type, sends a filtered network service request to a destination server on a network side, and sends, to the second terminal, content that is allowed to use the traffic and that is returned by the destination server. For example, when the file type of the requested content is video, and the target file type is text, the file type of the requested content is out of the scope of the target file type. If the file type of the requested content is text and image, and the target file type is text, the file type of the requested content overlaps with the target file type. An overlapped file type is text, a non-overlapped file type is image, and the image type is filtered out. If the file type of the requested content is text and image, and the target file type is text and image, the file type of the requested content completely overlaps with the target file type.

The packet inspection may be common packet inspection, or may be deep packet inspection. Alternatively, the packet inspection means that common packet inspection may be performed first, and if the file type of the content requested by the second terminal is not detected in the common packet inspection, deep packet inspection is performed.

In the common packet inspection, content at layer 4 and lower layers in the network service request is analyzed. The content includes a source address, a destination address, a source port, a destination port, and a protocol type. In the common packet inspection, a video protocol in the network service request can be detected. The video protocol may be an RTSP protocol or an RTP protocol, or may be an RTCP protocol. No specific limitation is set herein.

In the deep packet inspection, content at an application layer in the network service request is analyzed. The content includes a source address, a destination address, a source port, a destination port, and a protocol type. In the deep packet inspection, a streaming media protocol, an email protocol, a P2P protocol, or another protocol such as a VoIP protocol of the data packet can be detected. No specific limitation is set herein.

There are four identification mechanisms for deep packet inspection, such as IP quintuplet identification, characteristic string matching identification, signaling and data stream correlation identification, and behavioral characteristics identification. One or more identification mechanisms may be chosen depending on an actual situation, to perform the deep packet inspection on the data packet. No specific limitation is set herein.

In this embodiment of the present invention, the first terminal can perform precise traffic control on the network sharing hotspot according to the file type control policy set by the user, thereby diversifying network hotspot traffic control manners.

For ease of understanding, this embodiment is described with reference to a specific application scenario.

Figure 4:
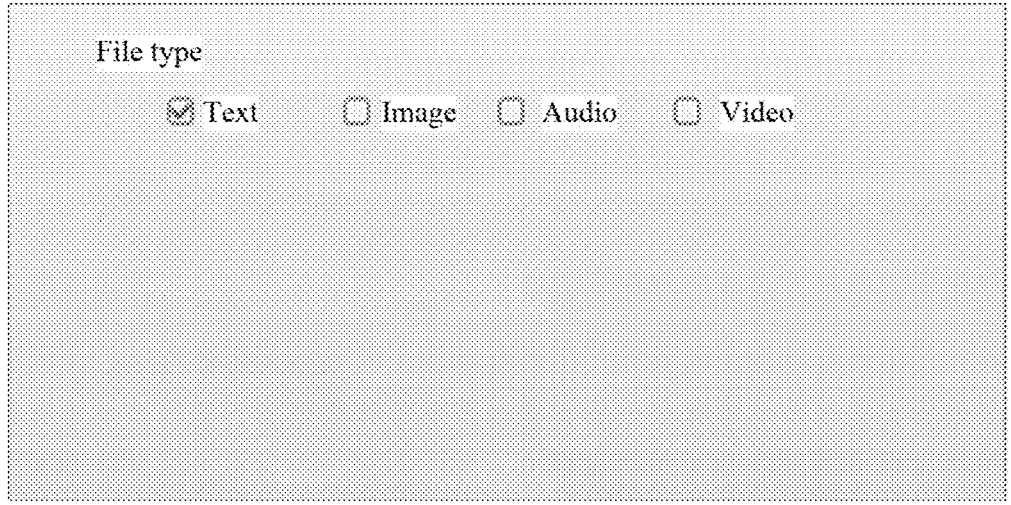
FIG. 4 is a schematic diagram of a traffic control manner that is based on a file type according to an embodiment of the present invention.

For example, a user A is in a high-speed railway compartment and wants to browse news through a notebook computer. The user A sets a mobile phone as a network sharing hotspot, and the notebook computer of the user A is connected to the mobile phone via the network sharing hotspot. If the user A needs to browse news, a corresponding text service can meet the requirement of the user A. The user may set the control policy as the control policy a1 of the control policy A. As shown in FIG. 4, only a "text" option is ticked on a setting interface, and other file type options are not selected. Then, the notebook computer of the user A can obtain only text content from the Internet, and cannot obtain other content such as audio, a video, and an image, thereby implementing traffic control over a network sharing hotspot of a mobile terminal.

In this scenario, the specified control policy a1 is only used as an example for description. No matter which one of the control policy a1 to the control policy a15 is set by the user, corresponding traffic control can be performed according to a corresponding control policy. Only a ticked file type is allowed to use traffic, and other unticked file types are not allowed to use traffic.

The foregoing describes a scenario that the control policy is the control policy A. The following describes a scenario that the control policy further includes the duration control policy, that is, the control policy is the control policy B.

The control policy B is the duration control policy+the control policy A.

In this embodiment of the present invention, when the specified control policy set by the user is the control policy B, after the first terminal executes a control solution of the control policy A, the method further includes: recording, by the first terminal, a moment at which the second terminal starts to use the traffic of the first terminal, where the moment is a first moment; recording, by the first terminal, a current moment in real time in a process in which the second terminal exchanges data with the Internet, where the current moment is a second moment; comparing the first moment and the second moment to obtain a time difference; determining whether the time difference reaches the total use traffic use duration set in the control policy B; and if the time difference reaches the total use traffic use duration set in the control policy B, disconnecting, by the first terminal, from the Internet, and stopping providing a network service for the second terminal. In this embodiment of the present invention, the first terminal can perform precise traffic control on the network sharing hotspot according to the file type control policy and the traffic duration control policy that are set by the user, thereby further diversifying network hotspot traffic control manners.

Figure 5:
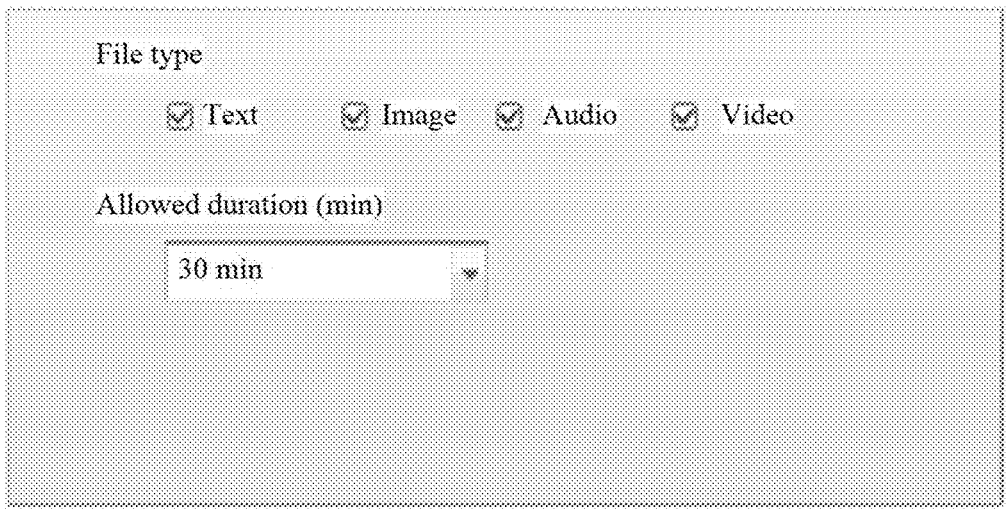
FIG. 5 is a schematic diagram of a traffic control manner that is based on a file type and duration according to an embodiment of the present invention.

For example, a user B is waiting for boarding at an airport and wants to browse a web page through a notebook to kill time. The user B sets a mobile phone as a network sharing hotspot, and the notebook computer of the user B is connected to the mobile phone via the network sharing hotspot. The user B will board a plane 40 minutes later. The user B limits traffic use duration to avoid being late for boarding, and intends to set total hotspot sharing duration to 30 minutes. As shown in FIG. 5, 30 minutes is set in a traffic use duration box on a setting interface. In this scenario, the user selects all text, image, audio, and video options under a file type. Certainly, the user may alternatively select one of or a combination of at least two of text, image, audio, and video depending on a need of the user. Then, the user B can enjoy a network service provided by the mobile phone at the user's will within 30 minutes. After the notebook computer uses a network for 30 minutes, the mobile phone stops providing traffic for the notebook computer, and the notebook computer cannot access the network.

The foregoing describes the scenario that the control policy is the control policy B. The following describes a scenario that the control policy further includes the total traffic control policy, that is, the control policy is the control policy C.

The control policy C is the total traffic control policy+the control policy A.

In this embodiment of the present invention, when the control policy set by the user is the control policy C, after the first terminal executes a control solution of the control policy A, the method further includes: obtaining, by the first terminal, a quantity of bytes received by the second terminal and a quantity of bytes sent by the second terminal; computing, based on the obtained quantities of bytes, real-time traffic used by the second terminal for the network service, where the real-time traffic is target total traffic; determining, by the first terminal, whether the target total traffic reaches the total use traffic set in the control policy C; and if the target total traffic reaches the total use traffic set in the control policy C, disconnecting, by the first terminal, from the Internet, and stopping providing the network service for the second terminal. In this embodiment of the present invention, the first terminal can perform precise traffic control on the network sharing hotspot according to the file type control policy and the total traffic control policy that are set by the user, thereby further diversifying network hotspot traffic control manners.

Figure 6:
FIG. 6 is a schematic diagram of a traffic control manner that is based on a file type and total traffic according to an embodiment of the present invention.

For example, a user C uses a mobile phone as a network sharing hotspot, and connects a notebook computer to the mobile phone via the network sharing hotspot. Considering that traffic of the mobile phone is limited, the user C controls total traffic of the network sharing hotspot to ensure that the traffic of the mobile phone is not exceeded. As shown in FIG. 6, total limited traffic 1 G is entered in an allowed traffic box on a setting interface. In this scenario, the user selects all text, image, audio, and video options under a file type. Certainly, the user may alternatively select one of or a combination of at least two of text, image, audio, and video depending on a need of the user. In this case, the user can enjoy a network service by using the notebook computer at the user's will, within the total traffic of 1 G. After network traffic used by the notebook computer reaches 1 G, the mobile phone stops providing traffic for the notebook computer, and the notebook computer cannot access the network any more.

The foregoing describes the scenario that the control policy is the control policy C. The following describes a scenario that the control policy further includes the duration control policy and the total traffic control policy, that is, the control policy is the control policy D.

The control policy D is the duration control policy+the total traffic control policy+the control policy A.

Figure 7:
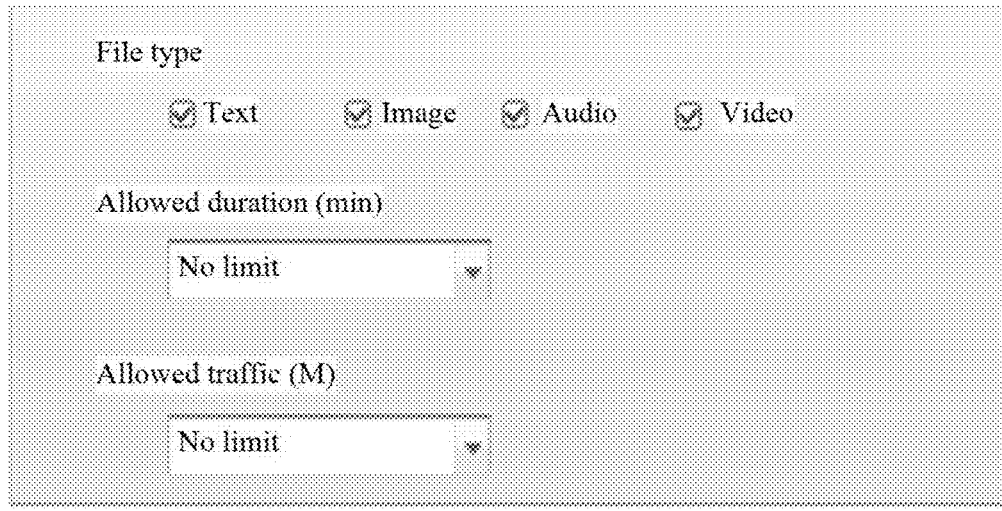
FIG. 7 is a schematic diagram of a traffic control manner that is based on a file type, duration, and total traffic according to an embodiment of the present invention.

When the control policy set by the first terminal includes the total traffic control policy and the duration control policy in addition to the file type control policy, after receiving the network service request of the second terminal, the first terminal controls both total traffic and traffic duration in addition to a file type. A detailed process is similar to those in the foregoing examples. Details are not repeated herein. As shown in FIG. 7, the user may set a traffic file type, traffic duration, and total traffic. In this embodiment of the present invention, the first terminal can perform customized traffic control on the network sharing hotspot according to the file type control policy, the total traffic control policy, and the traffic duration control policy that are set by the user, thereby further diversifying network hotspot traffic control manners.

Figures 8, 9:
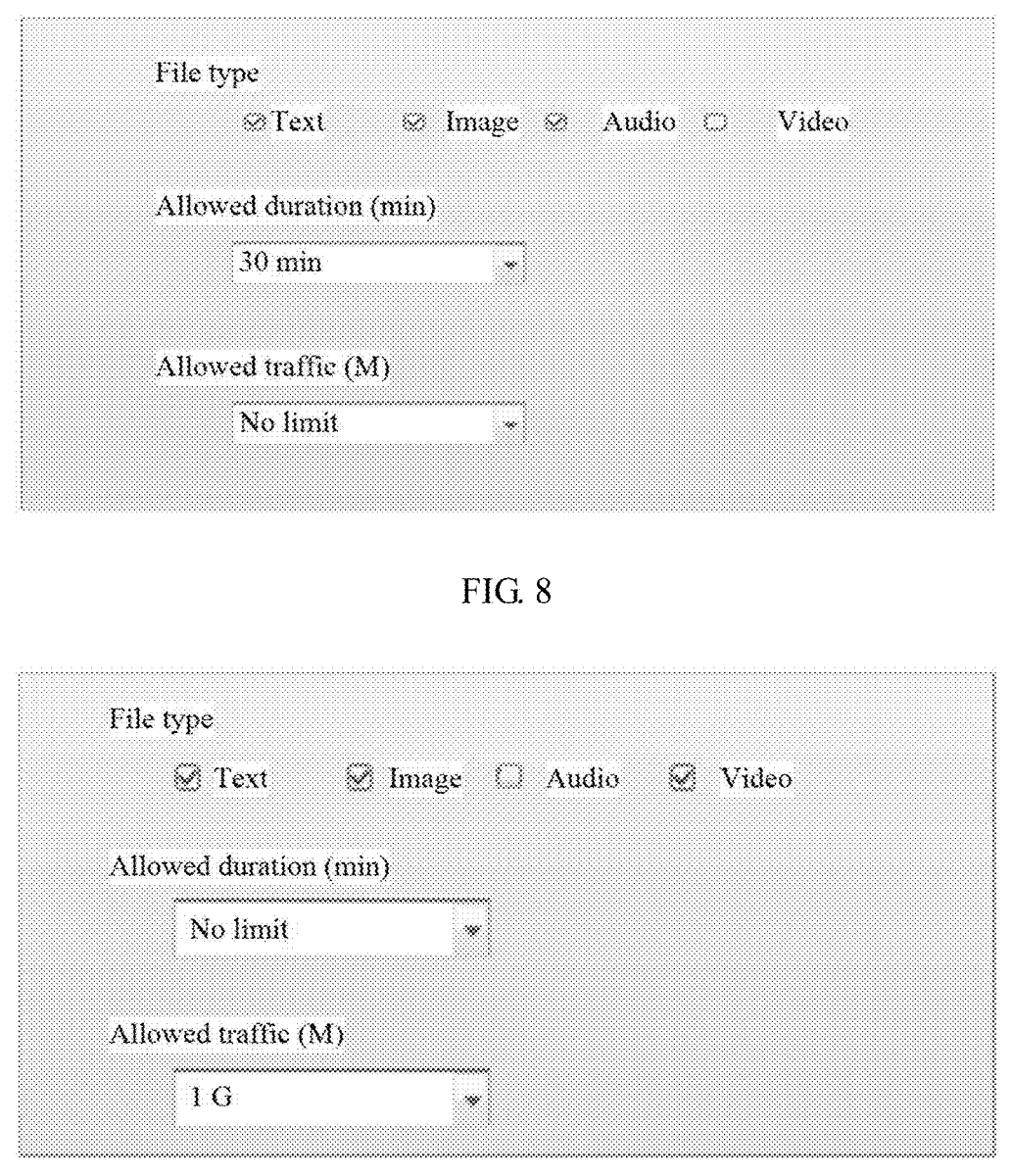

For example, a user D uses a mobile phone as a network sharing hotspot, and connects a notebook computer to the mobile phone via the network sharing hotspot. It is assumed that the user D not only wants to filter out a video application but also wants to limit a time for the notebook computer to use a network to 30 minutes. As shown in FIG. 8, the user sets an allowed duration option to 30 minutes on a setting interface, selects text, image, and audio options under a file type without selecting a video option, and sets no limit for a total allowed traffic option.

It is assumed that the user D not only wants to shield an audio type but also wants to limit total network traffic used by the notebook computer to 30 minutes. As shown in FIG. 9, the user sets an allowed traffic option to 1 G on a setting interface, selects text, image, and video options under a file type without selecting an audio option, and sets no limit for a traffic duration option. In this case, except for obtaining audio content, the user can enjoy a network service by using the notebook computer within the total traffic of 1 G. After network traffic used by the notebook computer reaches 1 G, the mobile phone stops providing traffic for the notebook computer, and the notebook computer cannot access the network any more.

Figure 10:
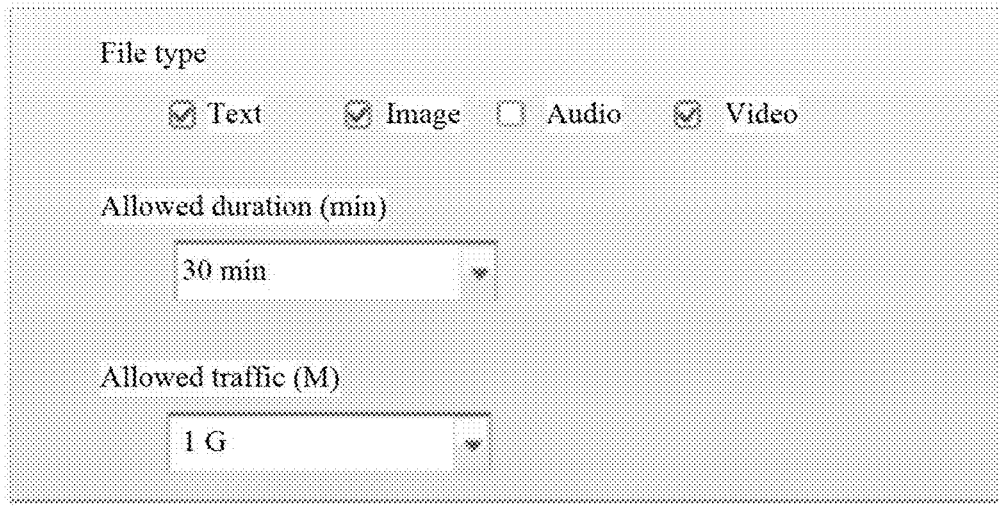
FIG. 10 is a schematic diagram of another scenario of file type, duration, and total traffic settings for traffic control according to an embodiment of the present invention.

It is assumed that the user D not only wants to shield an audio type, but also wants to limit total network traffic used by the notebook computer to 1 G, and limit total duration to 30 minutes. As shown in FIG. 10, the user sets an allowed traffic option to 1 G, sets an allowed duration option to 30 minutes, and selects text, image, and video options under a file type but does not select an audio option. And sets no limit for a traffic duration option. In this case, except for obtaining audio content, the user can enjoy a network service by using the notebook computer within the total traffic of 1 G and the total traffic use duration of 30 minutes. After network traffic used by the notebook computer reaches 1 G or total traffic use duration of the notebook computer reaches 30 minutes, the mobile phone stops providing traffic for the notebook computer, and the notebook computer cannot access the network any more. There are other setting scenarios, but no specific limitation is set herein. The user D can implement control on network hotspot traffic from a plurality of aspects by performing settings on the setting interface.

Figure 11:
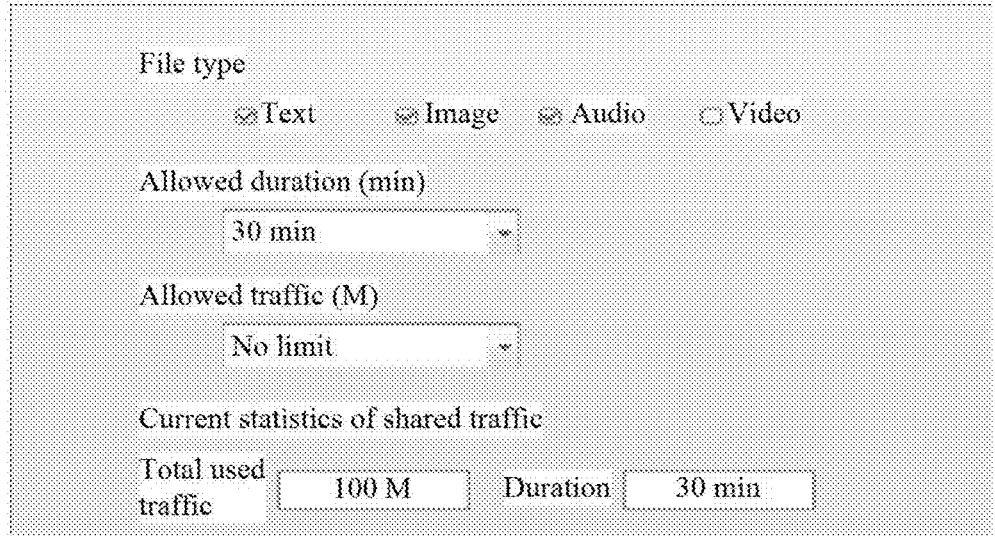
FIG. 11 is a schematic diagram of displaying a use state of shared traffic to a user according to an embodiment of the present invention.

In addition, in this embodiment of the present invention, after hotspot sharing ends, a display screen pops up on the first terminal, and the display screen displays, to the user, total traffic and total use duration that are used in the hotspot sharing. As shown in FIG. 11, a network sharing hotspot shares traffic of 100 M and shares traffic for 30 minutes. This helps the user learn of traffic statistics for this traffic sharing.

Figure 12:
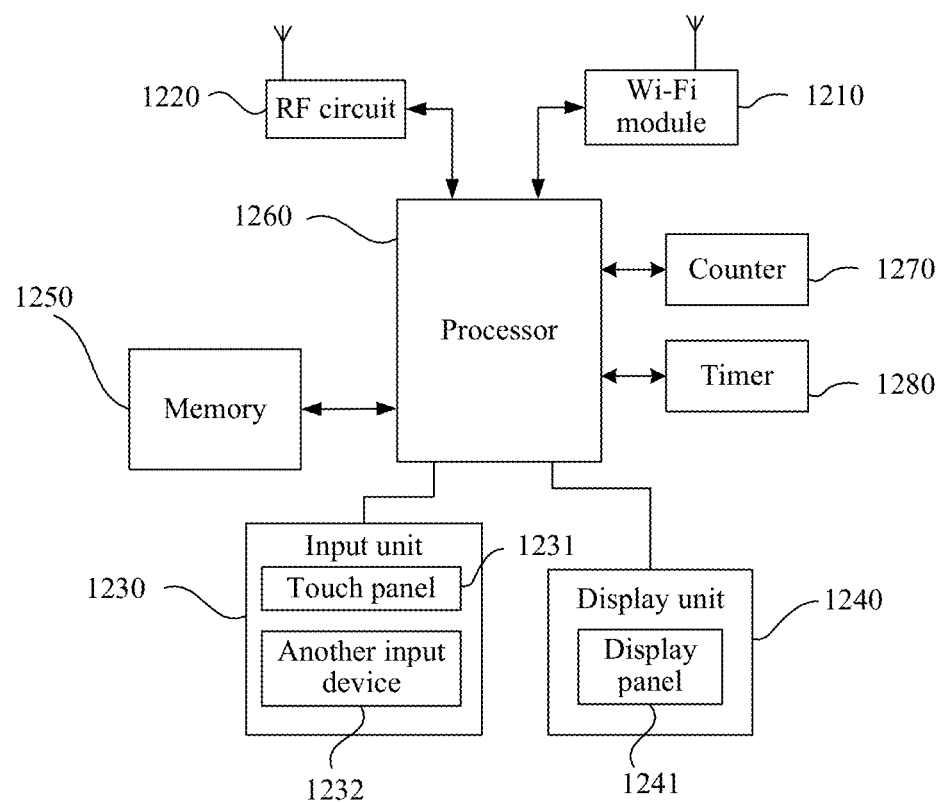
FIG. 12 is a schematic diagram of an embodiment of a mobile terminal according to an embodiment of the present invention.

The foregoing describes the method for controlling traffic of a network sharing hotspot in the embodiments of the present invention. The following describes the terminals in the embodiments of the present invention. Referring to FIG. 12, FIG. 12 shows a mobile terminal for controlling traffic of a network sharing hotspot according to an embodiment of the present invention.

FIG. 12 shows a block diagram of a partial structure of a mobile terminal according to an embodiment of the present invention. The mobile terminal is configured to provide a Wi-Fi hotspot and can control the Wi-Fi hotspot, and is the first mobile terminal in the foregoing embodiment. Referring to FIG. 12, the mobile terminal includes components such as a Wireless Fidelity (Wi-Fi, Wireless Fidelity) module 1210, a radio frequency (RF, Radio Frequency) circuit 1220, an input unit 1230, a display unit 1240, a memory 1250, a processor 1260, a counter 1270, and a timer 1280. Persons skilled in the art can understand that the structure of the terminal shown in FIG. 12 does not constitute a limitation to the mobile terminal, and the terminal may include more or fewer components than those shown in the figure, or may combine some components, or may have different component arrangement.

The following details each composition component of the mobile terminal with reference to FIG. 12.

Wi-Fi is a short-distance radio transmission technology, and the mobile terminal may use the Wi-Fi module 1210 to send or receive an e-mail, browse a web page, access streaming media, and the like, providing wireless broadband Internet access. In this embodiment of the present invention, the first terminal enables a network sharing hotspot function to start the Wi-Fi module 1210, and then transmits a hotspot signal around by using this module. A second mobile terminal establishes a hotspot connection to the first mobile terminal via the Wi-Fi module 1210 of the first mobile terminal. The second mobile terminal sends a network service request to the first mobile terminal on the hotspot connection. After receiving the network service request, the processor 1260 is invoked to invoke a specified control policy according to the network service request, where the specified control policy may be the foregoing control policy A, control policy B, control policy C, or control policy D, and sends a processed network service request by using the RF circuit 1220, to implement data transmission with the Internet.

The display unit 1240 may be configured to: display a control policy setting interface, such as the setting interfaces shown in FIG. 2 and FIG. 4 to FIG. 10, or provide, after traffic sharing for a user ends, a statistics collection screen, as shown in FIG. 11. The display unit 1240 may include a display panel 1241. Optionally, a liquid crystal display (Liquid Crystal Display, LCD), an organic light-emitting diode (Organic Light-Emitting Diode, OLED), or the like may be used to configure the display panel 1241. Further, a touch panel 1231 may cover the display panel 1241. After detecting a touch operation on or near the touch panel 1231, the touch panel 1231 sends the touch operation to the processor 1260 to determine a type of a touch event. Then, the processor 1260 provides corresponding visual output on the display panel 1241 based on the type of the touch event. Although the touch panel 1231 and the display panel 1241 are used as two independent components to implement input and input functions of the mobile terminal in FIG. 12, the touch panel 1231 and the display panel 1241 may be integrated to implement the input and output functions of the mobile terminal in some embodiments.

The input unit 1230 may be used by the user to set a control policy on a setting interface. Specifically, the input unit 1230 may include the touch panel 1231 and other input devices 1232. The touch panel 1231, also referred to as a touchscreen, may collect a touch operation of the user on or near the touch panel. For example, the user may set the control policy by using the touchscreen. For example, the user ticks, by using the touchscreen, the options that are ticked in FIG. 2 and FIG. 4 to FIG. 10; or enters the specific values of total traffic and total duration in FIG. 2 and FIG. 5 to FIG. 10 by using the touchscreen. Optionally, the touch panel 1231 may include two parts: a touch detection apparatus and a touch controller. The touch detection apparatus detects a touch orientation of the user, detects a signal brought by a touch operation, and sends the signal to the touch controller. The touch controller receives touch information from the touch detection apparatus, converts the touch information into contact coordinates, and sends the contact coordinates to the processor 1260, and can receive a command sent by the processor 1260 and execute the command. In addition, the touch panel 1231 may be implemented in multiple types, such as a resistive type, a capacitive type, an infrared type, and a surface acoustic wave type. In addition to the touch panel 1231, the input unit 1230 may further include the other input devices 1232. Specifically, the other input devices 1232 may include but are not limited to one or more of a physical keyboard, a function key (such as a volume control key or an on/off key), a trackball, a mouse, and a joystick.

The RF circuit 1220 is connected to the processor 1260 by using the bus. After the mobile terminal becomes a hotspot, the RF circuit 1220 is responsible for sending data to the Internet or receiving data from the Internet, and may be further configured to receive or send a signal in an information reception and transmission process or in a call process. In particular, the RF circuit 1220 receives downlink information sent by a base station and sends the downlink information to the processor 1260 for processing. In addition, the RF circuit 1220 sends related uplink data to the base station. Usually, the RF circuit 1220 includes but is not limited to an antenna, at least one amplifier, a transceiver, a coupler, a low noise amplifier (Low Noise Amplifier, LNA), a duplexer, or the like. In addition, the RF circuit 1220 may also communicate with a network and another device through radio communication. Any communications standard or protocol may be used for the radio communication, including but not limited to Global System for Mobile Communications (GSM), General Packet Radio Service (General Packet Radio Service, GPRS), Code Division Multiple Access (Code Division Multiple Access, CDMA), Wideband Code Division Multiple Access (Wideband Code Division Multiple Access, WCDMA), Long Term Evolution (Long Term Evolution, LTE), an email, a short message service (SMS), or the like.

The memory 1250 may be configured to store a software program and a module. The processor 1260 runs the software program and the module that are stored in the memory 1250, so as to perform various function applications of the mobile terminal and data processing. The memory 1250 may mainly include a program storage area and a data storage area. The program storage area may store an operating system, an application program required by at least one function (for example, a sound playback function and an image playback function), and the like. The data storage area may store data (for example, audio data and a phonebook) created based on use of the mobile terminal, and the like. In addition, the memory 1250 may be a high-speed random access memory, or may be a non-volatile memory such as at least one magnetic disk memory device, a flash memory device, or other volatile solid-state memory devices. In this embodiment of the present invention, the specified control policy is stored in the memory 1250. The processor 1260 invokes the specified control policy from the memory 1250 when needed.

The processor 1260 is a control center of the mobile terminal, and may control the network service request according to the control policy set by the user, such as the control policy A, the control policy B, the control policy C, or the control policy D described in the foregoing embodiments.

In a process of executing network hotspot control in this embodiment of the present invention, the input unit 1230 is configured to receive a hotspot setting operation;

the display unit 1240 is configured to display a setting interface used to set a control policy of a network hotspot;

the processor 1260 is configured to set the control policy of the network hotspot, where the control policy includes a file type control policy;

the memory 1250 is configured to store the control policy;

the Wi-Fi module 1210 is configured to receive a network service request sent by a second mobile terminal that has established a connection to the mobile terminal; and the processor 1260 is configured to control the network service request according to the control policy.

Optionally, when the file type control policy includes a target file type for which traffic shared by the first mobile terminal is used, the processor 1260 is specifically configured to control, based on the target file type, traffic used for the network service request.

Optionally, the processor 1260 is specifically configured to perform packet inspection on the network service request to obtain a file type of content requested by the network service request.

The Wi-Fi module 1210 is configured to: when the processor determines that the file type of the requested content is out of the scope of the target file type, send a rejection response to the second mobile terminal.

The processor 1260 is further configured to: when determining that the file type of the requested content overlaps with the target file type, filter out a file type that is in the network service request and that does not overlap with the target file type.

The RF circuit 1220 is configured to: after the processor 1260 filters the network service request, send a filtered network service request to a destination server; and receive content that is allowed to use the traffic and that is returned by the destination server.

The Wi-Fi module 1210 is further configured to send the content that is allowed to use the traffic to the second mobile terminal.

Optionally, the processor 1260 is specifically configured to:

perform common packet inspection on the network service request to determine a protocol type of the requested file content; and determine, based on indication of the protocol type, the file type of the requested content when the protocol type indicates a particular file type; or perform deep packet parsing on the network service request when the protocol type indicates no particular file type, to obtain the file type of the requested content.

Optionally, the counter 1270 is configured to collect a quantity of bytes received by the second mobile terminal and a quantity of bytes sent by the second mobile terminal.

The processor 1260 is further configured to:

obtain, from the counter 1270, the quantity of bytes received by the second mobile terminal and the quantity of bytes sent by the second mobile terminal;

determine whether target total traffic of the second mobile terminal reaches total use traffic, where the target total traffic is a sum of the quantity of bytes received by the second mobile terminal and the quantity of bytes sent by the second mobile terminal; and if the target total traffic of the second mobile terminal reaches the total use traffic, control the Wi-Fi module 1210 to stop providing a network service for the second mobile terminal.

Optionally, the timer 1280 is configured to record a first moment at which the second mobile terminal starts to use the traffic and a second moment at which the second mobile terminal is currently using the traffic.

The processor 1260 is further configured to:

obtain the first moment and the second moment from the timer 1280;

determine whether a time difference between the second moment and the first moment reaches total use duration; and if the time difference between the second moment and the first moment reaches the total use duration, control the Wi-Fi module 1210 to stop providing a network service for the second mobile terminal.

Optionally, the processor 1260 may include one or more processing units. Preferably, an application processor and a modem processor may be integrated into the processor 1260. The application processor mainly processes an operating system, a user interface, an application program, and the like. The modem processor mainly processes radio communication. It can be understood that the modem processor may not be integrated into the processor 1260.

Although not shown, the mobile terminal may further include a camera, a Bluetooth module, and the like. Details are not described herein.

Figure 13:
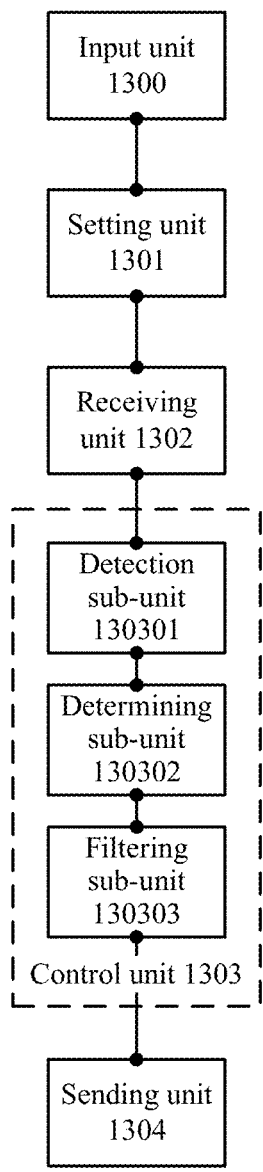
FIG. 13 is a schematic diagram of another embodiment of a mobile terminal according to an embodiment of the present invention.

The foregoing describes hardware of the mobile terminal for controlling traffic of a network sharing hotspot according to an embodiment of the present invention. The following describes a function of the terminal in the embodiments of the present invention. Referring to FIG. 13, the mobile terminal for controlling traffic of a network sharing hotspot according to an embodiment of the present invention may include:

an input unit 1300, configured to receive a hotspot setting operation;

a setting unit 1301, configured to set a control policy of a network sharing hotspot based on the hotspot setting operation received by the input unit 1300, where the control policy includes a file type control policy;

a receiving unit 1302, configured to receive a network service request sent by a second terminal that has established a connection to the mobile terminal; and a control unit 1303, configured to control, according to the control policy set by the setting unit 1301, the network service request received by the receiving unit 1302.

The setting unit 1301 may be configured to set a control policy A, a control policy B, a control policy C, or a control policy D, such as the various control policies shown in FIG. 2 and FIG. 4 to FIG. 10.

In this embodiment, the mobile terminal may be the host or the first terminal in FIG. 1 to FIG. 11. The mobile terminal can perform precise control on the network hotspot according to the specified file type control policy, a duration control policy, a total traffic control policy, and the like, thereby diversifying network hotspot control manners.

Optionally, in another embodiment of the mobile terminal in this embodiment of the present invention:

the control unit 1303 is specifically configured to: when the file type control policy includes a target file type for which a traffic shared by the first terminal is used, control, based on the target file type, traffic used for the network service request.

Optionally, in another embodiment of the mobile terminal in this embodiment of the present invention:

the mobile terminal further includes a sending unit 1304, and the control unit 1303 includes a detection sub-unit 130301, a determining sub-unit 130302, and a filtering sub-unit 130303.

The detection sub-unit 130301 is configured to: when the target file type includes at least one of text, image, audio, and video, perform packet inspection on the network service request to obtain a file type of content requested by the network service request.

The determining sub-unit 130302 is configured to: when determining that the file type, of the requested content, detected by the detection sub-unit 130301 is out of the scope of the target file type, send a rejection response to the second terminal via the sending unit.

The filtering sub-unit 130303 is configured to: when the determining sub-unit 130302 determines that the file type of the requested content overlaps with the target file type, filter out a file type that is in the network service request and that does not overlap with the target file type.

The sending unit 1304 is further configured to: send a filtered network service request to a destination server; and send, to the second terminal, content that is allowed to use the traffic and that is returned by the destination server.

The detection sub-unit 130301 is specifically configured to:

perform common packet inspection on the network service request to determine a protocol type of the requested file content; and determine, based on indication of the protocol type, the file type of the requested content when the protocol type indicates a particular file type; or perform deep packet parsing on the network service request when the protocol type indicates no particular file type, to obtain the file type of the requested content.

In this embodiment, the first terminal can perform precise control on the network sharing hotspot according to different specified file type control policies, and a detailed traffic control process is described. This diversifies network hotspot control manners.

Figure 14:
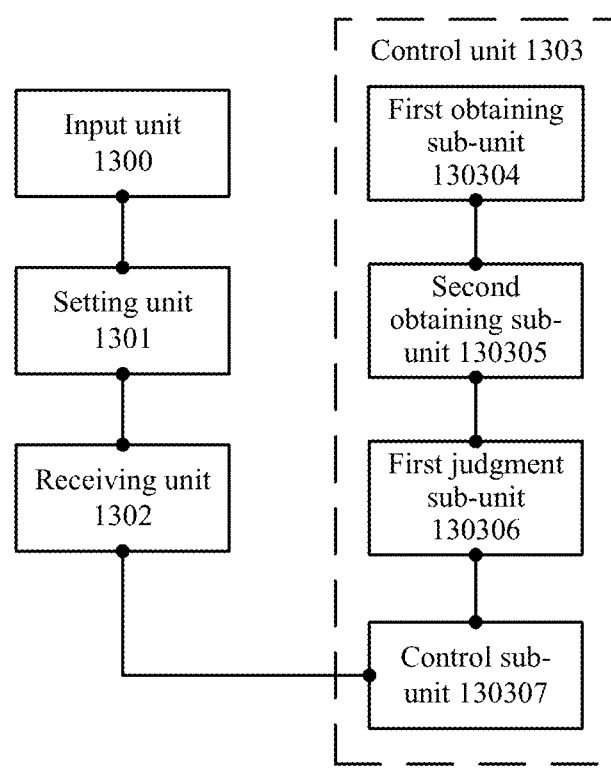
FIG. 14 is a schematic diagram of another embodiment of a mobile terminal according to an embodiment of the present invention.

Referring to FIG. 14, in another embodiment of the mobile terminal in this embodiment of the present invention, the control unit 1303 further includes a first obtaining sub-unit 130304, a second obtaining sub-unit 130305, a first judgment sub-unit 130306, and a control sub-unit 130307.

The first obtaining sub-unit 130304 is configured to obtain a quantity of bytes received by the second terminal.

The second obtaining sub-unit 130305 is configured to obtain a quantity of bytes sent by the second terminal.

The first judgment sub-unit 130306 is configured to determine whether target total traffic of the second terminal reaches total use traffic. The target total traffic is a sum of the quantity of bytes received by the second terminal that is obtained by the first obtaining sub-unit 130304 and the quantity of bytes sent by the second terminal that is obtained by the second obtaining sub-unit 130305.

The control sub-unit 130307 is further configured to: if the first judgment sub-unit 130306 determines that the target total traffic reaches the total use traffic, control the first terminal to stop providing a network service for the second terminal.

In this embodiment, the first terminal can perform precise control on the network hotspot according to different specified traffic file type control policies, and can also control the network hotspot according to the specified traffic duration control policy. This diversifies network hotspot control manners.

Figure 15:
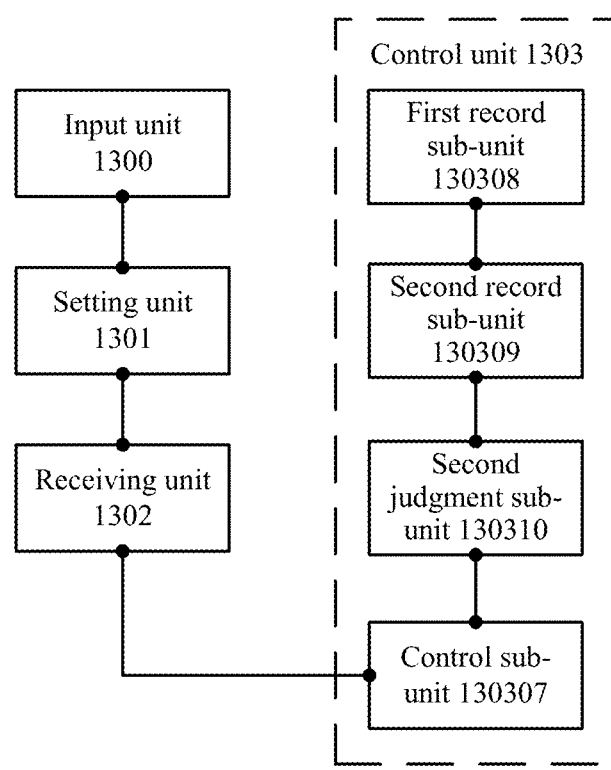
FIG. 15 is a schematic diagram of another embodiment of a mobile terminal according to an embodiment of the present invention.

Referring to FIG. 15, in another embodiment of the mobile terminal in this embodiment of the present invention, the control unit 1303 further includes a first record sub-unit 130308, a second record sub-unit 130309, a second judgment sub-unit 130310, and a control sub-unit 130307.

The first record sub-unit 130308 is configured to record a first moment at which the second terminal starts to use the traffic.

The second record sub-unit 130309 is configured to record a second moment at which the second terminal is currently using the traffic.

The second judgment sub-unit 130310 is configured to determine whether a time difference between the second moment recorded by the second record sub-unit 130309 and the first moment recorded by the first record sub-unit 130308 reaches total use duration.

The control sub-unit 130307 is further configured to: if the second judgment sub-unit 130310 determines that the time difference reaches the total use duration, control the first terminal to stop providing a network service for the second terminal.

In this embodiment, the first terminal can perform precise control on the network hotspot according to different specified file type control policies, and can also control the network hotspot according to the specified total traffic control policy. This diversifies network hotspot control manners.

It can be clearly understood by persons skilled in the art that, for the purpose of convenient and brief description, for a detailed working process of the foregoing system, apparatus, and unit, refer to a corresponding process in the foregoing method embodiments. Details are not repeated herein.

In the several embodiments provided in this application, it should be understood that, the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate. Parts displayed as units may or may not be physical units, and may be located in one position or may be distributed on multiple network units. Some or all of the units may be selected based on an actual need to achieve the objectives of the solutions of the embodiments.

In addition, functional units in the embodiments of the present invention may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of the software product. The computer software product is stored in a storage medium and includes several instructions for instructing a computer device (which may be a personal computer, a server, a network device, or the like) to perform all or some of the steps of the methods described in the embodiments of the present invention. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended to describe the technical solutions of the present invention, but not to limit the present invention. Although the present invention is described in detail with reference to the foregoing embodiments, persons of ordinary skill in the art should understand that, they may still make modifications to the technical solutions described in the foregoing embodiments or make equivalent replacements to some technical features thereof, without departing from the spirit and scope of the technical solutions of the embodiments of the present invention.

What is claimed is:

1. A network hotspot control method, comprising:
   receiving, by a first mobile terminal input circuit, a hotspot setting operation;
   setting, by the first mobile terminal, a control policy of a network hotspot, wherein control policy comprises a file type control policy, and wherein the file type control policy comprises a target file type for which traffic of the network hotspot controlled by the first mobile terminal is used;
   receiving, by the first mobile terminal, a network service request from a second mobile terminal having established a coupling to the first mobile terminal;
   performing, by the first mobile terminal, deep packet parsing on the network service request to obtain a file type of content requested by the network service request; and
   controlling, by the first mobile terminal, the network service request according to the file type control policy.

2. The method of claim 1, wherein the file type control policy comprises a target file type for which traffic shared by the first mobile terminal is used, and controlling the network service request comprising controlling, by the first mobile terminal based on the target file type, traffic used for the network service request target file type comprises text, image, audio, or video, and wherein controlling the traffic used for the network service request comprises:
   performing the deep packet parsing on the network service request to obtain a file type of content requested by the network service request, wherein the deep packet parsing comprises Internet Protocol (IP) quintuplet identification;
   sending, by the first mobile terminal, a rejection response to the second mobile terminal when the file type of the requested content is out of a scope of the target file type;
   filtering out, by the first mobile terminal, a file type in the network service request not overlapping with the target file type when the file type of the requested content overlaps with the target file type;
   sending, by the first mobile terminal, a filtered network service request to a destination server; and
   sending, by the first mobile terminal to the second mobile terminal, content allowed to use the traffic received from the destination server.

3. The method of claim 1, wherein the target file type comprises text, image, audio, or video, and wherein controlling the traffic used for the network service request comprises:
   performing deep packet parsing on the network service request to obtain a file type of content requested by the network service request, wherein the deep packet parsing comprises signaling and data stream correlation identification;

sending, by the first mobile terminal, a rejection response to the second mobile terminal when the file type of the requested content is out of a scope of the target file type;

filtering out, by the first mobile terminal, a file type in the network service request not overlapping with the target file type when the file type of the requested content overlaps with the target file type;

sending, by the first mobile terminal, a filtered network service request to a destination server; and sending, by the first mobile terminal to the second mobile terminal, content allowed to use the traffic received from the destination server.

4. The method of claim 1, further comprising:

performing, by the first mobile terminal, common packet inspection on the network service request to determine a protocol type of the requested content;

determining, by the first mobile terminal based on indication of the protocol type, the file type of the requested content when the protocol type indicates a particular file type; and performing, by the first mobile terminal, the deep packet parsing on the network service request when the protocol type indicates no particular file type to obtain the file type of the requested content.

5. The method of claim 1, wherein the control policy further comprises total use traffic, and wherein the method further comprises:

obtaining, by the first mobile terminal, a quantity of bytes received by the second mobile terminal;

obtaining, by the first mobile terminal, a quantity of bytes sent by the second mobile terminal;

determining, by the first mobile terminal, whether target total traffic of the second mobile terminal reaches the total use traffic, wherein the target total traffic comprises a sum of the quantity of bytes received by the second mobile terminal and the quantity of bytes sent by the second mobile terminal; and stopping providing, by the first mobile terminal, a network service for the second mobile terminal when the target total traffic of the second mobile terminal reaches the total use traffic.

6. The method of claim 1, wherein the control policy further comprises total use duration, wherein the total use duration comprises a time difference between a first moment at which the second mobile terminal starts to use the traffic and a second moment at which the second mobile terminal is currently using traffic, the method further comprising:

recording, by the first mobile terminal, the first moment;

recording, by the first mobile terminal, the second moment;

determining, by the first mobile terminal, whether the total use duration is reached; and stopping providing, by the first mobile terminal, a network service for the second mobile terminal when the total use duration is reached.

7. The method of claim 1, wherein performing, by the first mobile terminal, deep packet parsing on the network service request further comprises characteristic string matching identification.

8. The method of claim 1, wherein performing, by the first mobile terminal, deep packet parsing on the network service request further comprises behavioral characteristics identification.

9. A mobile terminal, comprising:

an input circuit configured to receive a hotspot setting operation, wherein the hotspot setting operation comprises:

setting, by the mobile terminal, a control policy of a network hotspot, wherein the control policy comprises a file type control policy, and wherein the file type control policy comprises a target file type for which traffic of the network hotspot controlled by the mobile terminal is used;

receiving, by the mobile terminal, a network service request from a second mobile terminal having established a coupling to the mobile terminal;

performing, by the mobile terminal, deep packet parsing on the network service request to obtain a file type of content requested by the network service request;

a display coupled to the input circuit using a bus and configured to display a setting interface setting the control policy of the network hotspot;

a memory coupled to the input circuit and the display using the bus and configured to store the control policy, the control policy comprising the file type control policy;

a processor coupled to the input circuit, the display, and the memory using the bus and configured to set the control policy of the network hotspot based on the hotspot setting operation; and a WI-FI circuit coupled to the input circuit, the display, the memory, and the processor using the bus and configured to receive the network service request from the second mobile terminal, and wherein the processor is further configured to control the network service request according to the control policy.

10. The mobile terminal of claim 9, wherein the processor is further configured to perform deep packet parsing on the network service request to obtain a file type of content requested by the network service request, wherein the deep packet parsing comprises Internet Protocol (IP) quintuplet identification, wherein the WI-FI circuit is further configured to send a rejection response to the second mobile terminal when the processor determines that the file type of the requested content is out of a scope of the target file type, wherein the processor is further configured to filter out a file type in the network service request not overlapping with the target file type when the file type of the requested content overlaps with the target file type, and wherein the WI-FI circuit is configured to:

send a filtered network service request to a destination server after the processor filters the network service request;

receive content allowed to use the traffic from the destination server; and send the content to the second mobile terminal.

11. The mobile terminal of claim 9, further comprising a radio frequency (RF) circuit coupled to the processor using the bus, wherein the processor is further configured to perform deep packet parsing on the network service request to obtain a file type of content requested by the network service request, wherein the deep packet parsing comprises signaling and data stream correlation identification, wherein the WI-FI circuit is further configured to send a rejection response to the second mobile terminal when the processor determines that the file type of the requested content is out of a scope of the target file type, wherein the processor is further configured to filter out a file type in the network service request not overlapping with the target file type when the file type of the requested content overlaps with the target file type, and wherein the RF circuit is configured to:
 send a filtered network service request to a destination server after the processor filters the network service request;
 receive content allowed to use the traffic from the destination server, and
 send the content to the second mobile terminal.

12. The mobile terminal of claim 9, wherein the processor is further configured to:
 perform common packet inspection on the network service request to determine a protocol type of the requested content;
 determine, based on indication of the protocol type, the file type of the requested content when the protocol type indicates a particular file type; and
 perform deep packet parsing on the network service request when the protocol type indicates no particular file type to obtain the file type of the requested content.

13. The mobile terminal of claim 9, further comprising a counter coupled to the processor using the bus and configured to collect a quantity of bytes received by the second mobile terminal and a quantity of bytes sent by the second mobile terminal, wherein the processor is further configured to:
 obtain, from the counter, the quantity of bytes received by the second mobile terminal and the quantity of bytes sent by the second mobile terminal;
 determine whether target total traffic of the second mobile terminal reaches total use traffic, wherein the target total traffic comprises a sum of the quantity of bytes received by the second mobile terminal and the quantity of bytes sent by the second mobile terminal; and
 control the WI-FI circuit to stop providing a network service for the second mobile terminal when the target total traffic of the second mobile terminal reaches the total use traffic.

14. The mobile terminal of claim 9, further comprising a timer coupled to the processor using the bus and configured to record a first moment at which the second mobile terminal starts to use the traffic and a second moment at which the second mobile terminal is currently using the traffic, wherein the processor is further configured to:
 obtain the first moment and the second moment from the timer;
 determine a total use duration, wherein the total use duration comprises a time difference between the first moment and the second moment; and
 control the WI-FI circuit to stop providing a network service for the second mobile terminal when the total use duration is reached.

15. A computer program product comprising a non-transitory computer readable storage medium storing a program code thereon for network hotspot control, the program code comprising instructions for executing a method that comprises:
 receiving, by a first mobile terminal, a hotspot setting input;
 setting, by the first mobile terminal, a control policy of a network hotspot, wherein the control policy comprises a file type control policy, and wherein the file type control policy comprises a target file type for which traffic of the network hotspot controlled by the first mobile terminal is used;
 receiving, by the first mobile terminal, a network service request from a second mobile terminal having established a coupling to the first mobile terminal;
 performing, by the first mobile terminal, deep packet parsing on the network service request to obtain a file type of content requested by the network service request; and
 controlling, by the first mobile terminal, the network service request according to the control policy.

16. The computer program product of claim 15, wherein the target file type comprises text, image, audio, or video, and wherein controlling the traffic used for the network service request comprises:
 performing the deep packet parsing on the network service request to obtain a file type of content requested by the network service request, wherein the deep packet parsing comprises Internet Protocol (IP) quintuplet identification;
 sending, by the first mobile terminal, a rejection response to the second mobile terminal when the file type of the requested content is out of a scope of the target file type;
 filtering out, by the first mobile terminal, a file type in the network service request not overlapping with the target file type when the file type of the requested content overlaps with the target file type;
 sending, by the first mobile terminal, a filtered network service request to a destination server; and
 sending, by the first mobile terminal to the second mobile terminal, content allowed to use the traffic received from the destination server.

17. The computer program product of claim 15, wherein the target file type comprises text, image, audio, or video, and wherein controlling the traffic used for the network service request comprises:
 performing, by the first mobile terminal, deep packet parsing on the network service request to obtain a file type of content requested by the network service request, wherein the deep packet parsing comprises signaling and data stream correlation identification;
 sending, by the first mobile terminal, a rejection response to the second mobile terminal when the file type of the requested content is out of a scope of the target file type;
 filtering out, by the first mobile terminal, a file type in the network service request not overlapping with the target file type when the file type of the requested content overlaps with the target file type;
 sending, by the first mobile terminal, a filtered network service request to a destination server; and
 sending, by the first mobile terminal to the second mobile terminal, content allowed to use the traffic received from the destination server.

18. The computer program product of claim 15, further comprising:
 performing, by the first mobile terminal, common packet inspection on the network service request to determine a protocol type of the requested content;
 determining, by the first mobile terminal based on indication of the protocol type, the file type of the requested content when the protocol type indicates a particular file type; and
 performing, by the first mobile terminal, the deep packet parsing on the network service request when the protocol type indicates no particular file type to obtain the file type of the requested content.

19. The computer program product of claim 15, wherein the control policy further comprises total use traffic, and wherein the method further comprises:

obtaining, by the first mobile terminal, a quantity of bytes received by the second mobile terminal;

obtaining, by the first mobile terminal, a quantity of bytes sent by the second mobile terminal;

determining, by the first mobile terminal, whether target total traffic of the second mobile terminal reaches the total use traffic, wherein the target total traffic comprising a sum of the quantity of bytes received by the second mobile terminal and the quantity of bytes sent by the second mobile terminal; and stopping providing, by the first mobile terminal, a network service for the second mobile terminal when the target total traffic of the second mobile terminal reaches the total use traffic.

20. The computer program product of claim 15, wherein the control policy further comprises total use duration, wherein the total use duration comprises a time difference between a first moment at which the second mobile terminal starts to use the traffic and a second moment at which the second mobile terminal is currently using traffic, the method further comprising:

recording, by the first mobile terminal, the first moment;

recording, by the first mobile terminal, the second moment;

determining, by the first mobile terminal, whether the total use duration is reached; and stopping providing, by the first mobile terminal, a network service for the second mobile terminal when the total use duration is reached.

* * * * *